Sept. 27, 1966  F. B. BREAKSPEAR  3,274,705
APPARATUS FOR PRACTISING AND TEACHING EXPIRED
AIR ARTIFICIAL RESPIRATION
Filed Aug. 20, 1963  2 Sheets-Sheet 1

INVENTOR
FRANCIS B. BREAKSPEAR
BY *Aaron R. Townshend*
ATTORNEY

INVENTOR
FRANCIS B. BREAKSPEAR
BY Aaron R. Townshend
ATTORNEY

United States Patent Office 3,274,705
Patented Sept. 27, 1966

3,274,705
APPARATUS FOR PRACTISING AND TEACHING EXPIRED AIR ARTIFICIAL RESPIRATION
Francis Bertrand Breakspear, Emsworth, England, assignor to The British Oxygen Company Limited, a British company
Filed Aug. 20, 1963, Ser. No. 303,336
2 Claims. (Cl. 35—17)

This invention relates to apparatus for use in practising and teaching expired-air artificial respiration.

In recent years there has been added to the already well known methods of artificial respiration a further method, known as the Expired-Air Method of Artificial Respiration. According to this method the patient preferably lies on his back, with his head held back, and the person offering assistance places his mouth over the mouth or nose of the patient. Air is then forced into the patient's lungs to expand them, the nose or mouth, respectively, of the patient being gently squeezed to close it during this operation, and a period of about three to four seconds is then allowed for the air to be expelled again by the natural collapse of the patient's chest. This process is then repeated until such time as the patient is capable of breathing for himself.

The method has been used successfully in so many instances that it has become accepted by controlling bodies concerned with teaching those persons associated with first aid, ambulance corps, life saving groups at swimming pools and coastal resorts, and many allied associations and professions. The method, for best results, should be carefully taught to ensure that the patient is suitably prepared or arranged for treatment, and that the timing and strength of the air transfer periods are correctly timed and applied. This aspect of the method, at present, constitutes a considerable drawback to the teaching of the method since mock patients are naturally reluctant to permit others to blow air into their lungs, and personal contact orally may transmit infection.

It is an object of the present invention to provide means whereby a live mock patient can permit himself to be used for practice purposes of expired-air artificial respiration in the knowledge that he will not be forced to accept the air that is exhaled by others, and there will be no oral contact.

According to the present invention, an apparatus is provided for practising or teaching expired-air artificial respiration comprising a unit having a mouthpiece and associated nostril for use by a person practising the method, first passage means connecting the said mouthpiece and associated nostril, support means whereby the unit may be supported above the mouth of a second person in supine position acting as patient by the head of the said second person, an inflatable bag simulating a lung, second passage means connecting the first passage means to the said inflatable bag, and constricting means mounted on the unit and adapted to cause constriction of the second passage means if the said second person in supporting the unit does not tilt his head to the correct position in relationship to his body for expired-air artificial respiration, the constricting means being ineffective to cause constriction of the second passage means when the head of the said second person is correctly tilted.

The constricting means may guide the second passage means towards the neck or chest of the second person in such a way that the second passage means is constricted by bearing against the body of the second person when his head is incorrectly tilted.

The associated nostril may be closed in use by the cheek of the person practising the method, or by constricting the first passage means. For this purpose the first passage means may include a rubber tube, for example, or be a resilient moulded member simulating a human nose and including a passage which may be closed by pinching the "nose."

In use the unit is carried by and tiltable with the head of the second person, and it is preferred that the support means includes a member adapted to be gripped in the mouth of this person. This gripping member may be formed with a passage through which the second person may breathe.

The invention also comprises a unit having on one side a mouthpiece and associated nostril for use by a person practising the method, first passage means connecting the mouthpiece and associated nostril, and having on the opposite side a gripping member adapted to be held in the mouth of a second person acting as patient, and a vent from the first passage means adapted to direct away from the face of the said second person any air breathed into the first passage means by the person practising the method.

Two embodiments of the present invention will now be described by way of example with reference to the accompanying drawings, in which.

Figure 1:
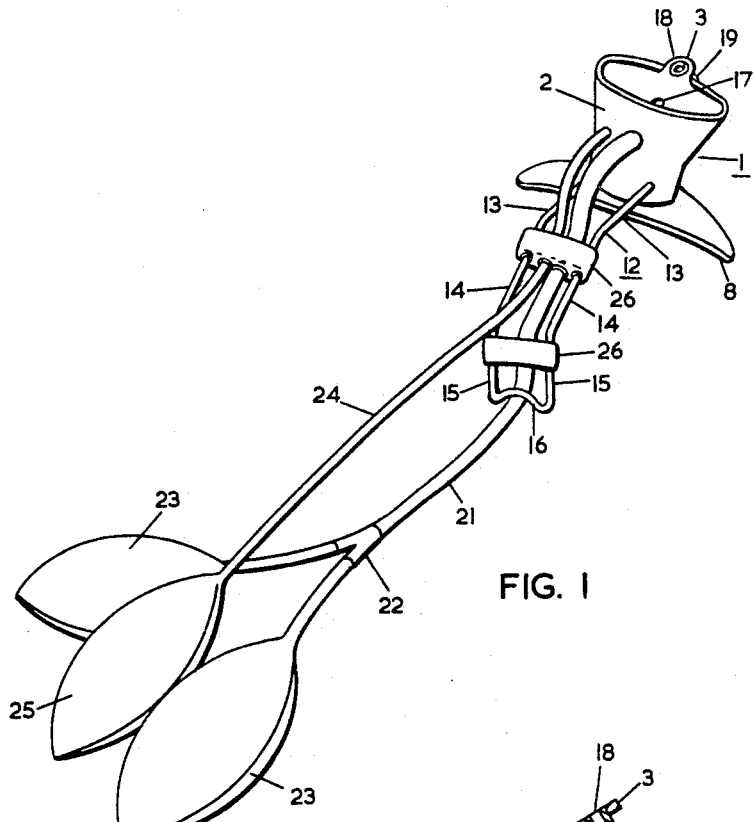
FIGURE 1 is a perspective view of the first apparatus in accordance with the present invention.
Figure 2:
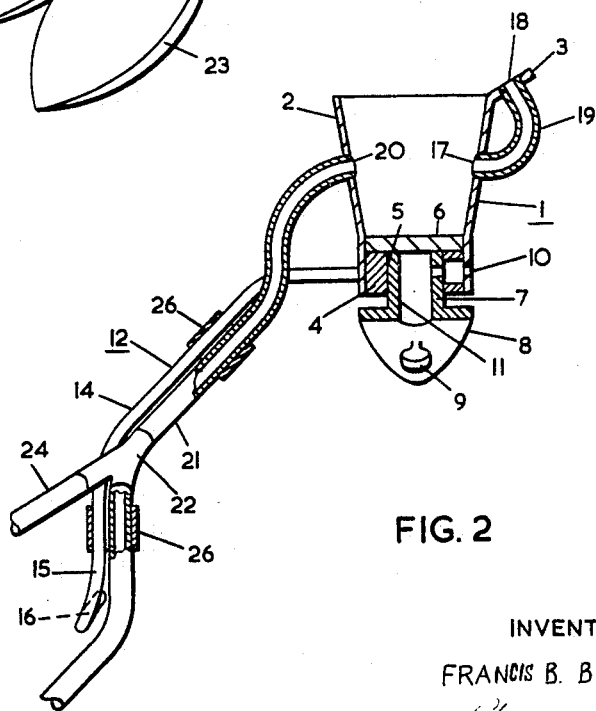
FIGURE 2 is a sectional view of part of the apparatus shown in FIGURE 1.

Referring to FIGURES 1 and 2, an upper mouthpiece 1 is formed from the neck of a conventional rubber hot water bottle having a flexible bell portion 2 formed with an apertured hanging tag 3 and a hard core 4 which would normally receive a bung or the like in an aperture 5.

The space within the bell portion is isolated from the aperture 5 by a rubber diaphragm 6 secured with a suitable adhesive, e.g. rubber solution, and the aperture 5 receives from below an apertured stem 7 of a conventional rubber "snorkel" mouthpiece 8 hereinafter referred to as the lower mouthpiece having teeth grips 9, one of which is shown in FIGURE 2. A side hole 10 is bored through the hard core 4 and the stem 7 to communicate with the aperture 11 therein. Two blind holes (not shown) are also bored into the hard core 4 from the opposite side thereof from the hole 10 and these blind holes receive the two ends of a generally U-shaped rigid wire frame 12. The arms of the U are generally parallel and extend from the hard core 4 in generally horizontal reaches 13 which join sloping reaches 14 inclined downwardly and away from the hard core. The sloping reaches then join generally vertical reaches 15 which are finally joined together by an upwardly crooked connecting portion 16.

On the same side of the bell portion of the upper mouthpiece as the tag 3 is bored a hole 17 and this hole and the aperture 18 in the tag are connected by a piece of rubber tubing 19 hereinafter referred to as the "nose" tube and constituting first passage means. On the opposite side of the bell portion a further hole 20 is bored from which extends a long piece of rubber tubing 21 constituting second passage means and hereinafter referred to as the "trachea" tube which is connected with a Y-junction tubular piece 22 leading to two inflatable rubber bladders, balloons or disposable bags 23 hereinafter referred to as "lung" bag. Beside the hole 20 is a further smaller hole from which extends a further long piece of tubing 24 again secured by a suitable adhesive, e.g. rubber solution, and hereinafter referred to as the "gullet" tube and leading to a third inflatable rubber bladder, balloon or disposable bag 25 hereinafter referred to as the "stomach" bag.

The "trachea" tube 21 is secured behind and between the arms of the frame 12 by means of adhesive tape 26 or other suitable means at points on the sloping and generally vertical reaches 14 and 15 of the frame and is trained under the portion 16 of the frame. The "gullet" tube 24 is secured alongside the "trachea" tube by the adhesive tape 26 on the sloping reach 14 of the frame but is otherwise free.

In expired-air artificial respiration it is necessary for a patient in a supine position to have his head tilted back away from his chest in order to avoid constriction of his trachea by virtue of his tongue blocking his throat. Furthermore, in mouth-to-mouth respiration it is necessary to close the patient's nostrils either by pinching his nose or by placing one's cheek over his nostrils. Likewise, in mouth-to-nose artificial respiration it is necessary to close the patient's lips. The apparatus described is designed to give to a person being taught such artificial respiration the illusion of reality and to impress upon him the necessary precautions mentioned above.

In use, a mock patient is in a supine position with the lower mouthpiece 8 in his mouth, the rigid wire frame over his chin and the lung bags and stomach bag 23 and 25 lying appropriately. Realism is achieved by placing a blanket or coat over the lung bags and stomach bag. If the mock patient's head is not sufficiently tilted back the "trachea" tube 21, whose walls are thin and have good elastic recovery, is constricted and collapses under the portion 16 of the rigid wire frame and consequently the lung bags 23 cannot be inflated. Thus, before using the apparatus care is taken to maintain the "trachea" tube unconstricted by tilting back the mock patient's head sufficiently.

A person teaching, being taught or practising the kind of artificial respiration with which the invention is concerned kneels down beside the head of the mock patient and, in the case of mouth-to-mouth artificial respiration, places his mouth against the upper mouthpiece. As will be evident, in order to inflate the lung bags and the stomach bag the "nose" tube 19 must be closed since otherwise exhaled breath entering the bell portion 2 would simply escape through the "nose" tube. The "nose" tube can be closed either by pinching same or by the person placing his cheek against the aperture 18.

Likewise, in the case of mouth-to-nose artificial respiration where the person blows into the aperture 18, in order to inflate the lung bags and stomach bag, the rim or "lips" of the bell portion 2 must be pinched so as to prevent exhaled breath escaping therethrough.

In either mode of use the person using the apparatus inflates the lung bags and, sometimes, stomach bag and then allows the lung bags to become deflated, the stomach bag being deflated by hand, while observing the consequent rise and fall of the blanket or coat covering the lung bags and stomach bag. The effect obtained is most realistic and the apparatus quickly teaches a person using it to develop a respriratory and, if necessary, hand pressure rhythm suitable for use in giving artificial respiration to an asphyxiated patient. It will be noted also that the person using the apparatus makes no oral contact with the mock patient and neither accepts the exhaled breath of the other. The mock patient is at liberty to breathe directly through his nose or through his mouth via the side hole 10 and the aperture 11. Furthermore, in the interests of hygiene, the lung bags and stomach bag may be, as stated above, disposable bags which can be replaced after use of the apparatus by one operator so that the next operator does not inhale any exhaled breath of the previous operator residual in the used bags.

It is to be pointed out the apparatus described need not include the rigid wire frame, the "trachea" and "gullet" tubes, and the lung bags and stomach bag but merely the mouth unit and the "nose" tube. For instance, for examination purposes an examiner only requires to see that the operator being examined tilts back the head of a mock patient, closes the appropriate orifices depending upon which mode of expired-air artifical respiration he is using, and exhibits a suitable respiratory rhythm.

The mouth unit comprising upper and lower mouthpieces may be constructed in any other suitable manner than that described and, instead of rubber, it may be made of any other suitable material such that it can be easily disinfected.

As an alternative to making the lower mouthpiece in the form shown it can be replaced by a mask adapted to be held over the mouth of the person acting as the patient and covering a part or the whole of the face of such person.

If desired the bag 25 can be omitted from the apparatus. Futhermore, the two bags 23 can be replaced by a single inflatable bag.

Figure 3:
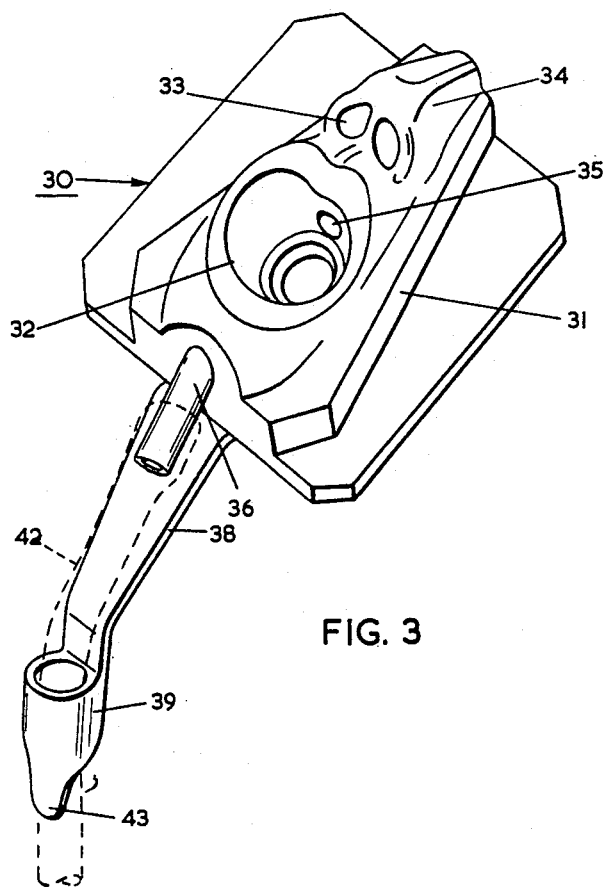
FIGURE 3 is a perspective view of the mouth unit of the second apparatus.
Figure 4:
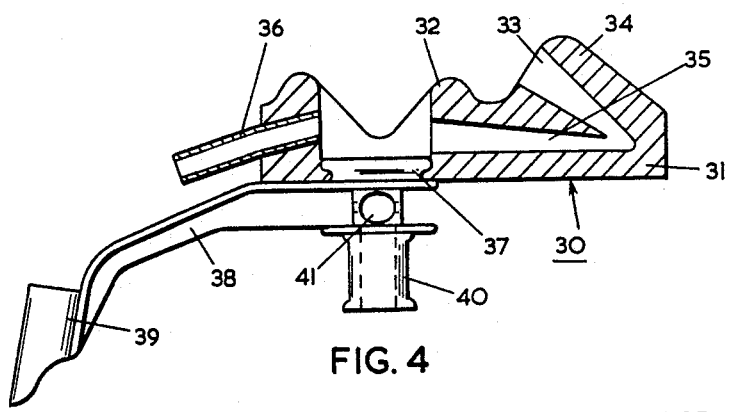
FIGURE 4 is a sectional view of the apparatus shown in FIGURE 3.

Referring to FIGURES 3 and 4, the second apparatus comprises a mouth unit 30 which includes a central part 31 of moulded material simulating a human mouth and nose. The interior of the mouthpiece 32 communicates with nostrils 33 in the "nose" 34 by way of first passage means 35, and a vent tube 36 provides an outlet from the interior of the mouthpiece and passage means 35. The rear of the mouthpiece is closed by a plug 37 which secures the part 31 to a bracket 38 adapted to extend over the chin of the mock patient and carrying a tube guide 39. A mouthpiece 40 for the mock patient extends to the rear of plug 37, this mouthpiece being hollow and arranged to discharge the mock patient's breath through an outlet 41.

The central part 31 is constructed of pliable material so that the mouthpiece 32 and nostrils 33 may be closed respectively by pressing the rim or "lips" of the mouthpiece together or by pinching the "nose" or by obstructing the mouthpiece 32 or nostrils 33 with the cheek of the person practising the method. The correct pressure sealing techniques for expired-air artificial respiration can thus can be taught and practised with the aid of this mouth unit, and it will be appreciated that the exhaled breath of either person will be directed away from the face of the other person.

As with the first apparatus a "lung bag" (not shown) may be connected by way of second passage means, such as a rubber tube 42, to the mouthpiece 32. As shown the end of the tube 42 is engaged over vent tube 36, and the tube 42 then extends through tube guide 39 to the lung bag. With the lung bag resting on the chest of the mock patient supporting the mouth unit the tube 42 will be unconstricted if the mock patient's head is tilted to the correct position in relationship to his body. In the incorrect position, however, the terminal portion 43 of the tube guide 39 will be closer to the mock patient's body and will bear against the upper side of tube 42 and constrict this tube.

I claim:

1. Apparatus for practising or teaching expired-air artificial respiration comprising a unit having a mouthpiece and associated nostril for use by a first person practising this method, first passage means connecting the said mouthpiece and associated nostril, support means whereby the unit may be supported above the mouth of a second person in supine position acting as patient by the head of the said second person, an inflatable bag simulating a lung, second passage means connecting the mouthpiece and the first passage means to the said inflatable bag, and constricting means of substantially rigid material mounted on the unit and substantially rigidly attached to the support means and adapted to guide the second passage means towards the neck or chest of the second person in such a way that the second passage means is constricted by bearing against the body of the second person if the said second person in supporting the unit does not have his head tilted to the correct position in relationship to his body for expired-air artificial respiration, the constricting means being ineffective to cause constriction of the second passage means when the head of the said second person is correctly tilted.

2. Apparatus as claimed in claim 1, wherein the support means includes a lower mouthpiece to which the constricting means is substantially rigidly attached, adapted to be gripped in the mouth of the second person and having a passage communicating with the atmosphere through which the second person may breathe.

References Cited by the Examiner

UNITED STATES PATENTS

| | | | |
|---|---|---|---|
| 2,904,898 | 9/1959 | Marsden | 35—17 |
| 3,152,404 | 10/1964 | Cheshire et al. | 35—17 |

FOREIGN PATENTS 240,852  10/1962  Australia.

EUGENE R. CAPOZIO, *Primary Examiner.*

H. S. SKOGQUIST, *Assistant Examiner.*